July 17, 1934.  A. BURI  1,966,787
COOLING FAN FOR VEHICLES DRIVEN BY INTERNAL COMBUSTION ENGINES
Filed March 8, 1932
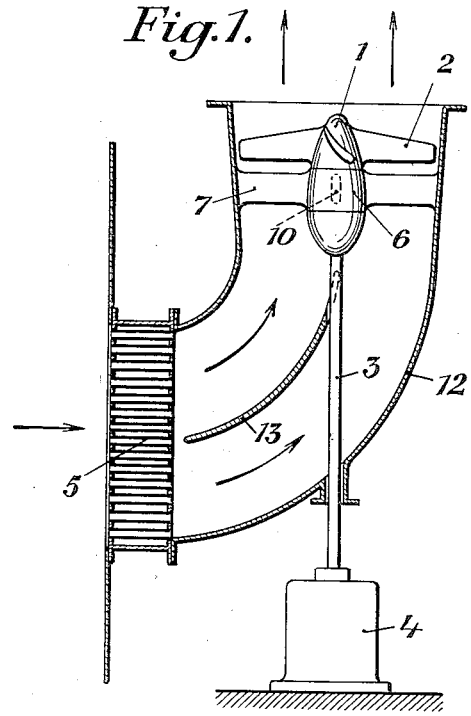
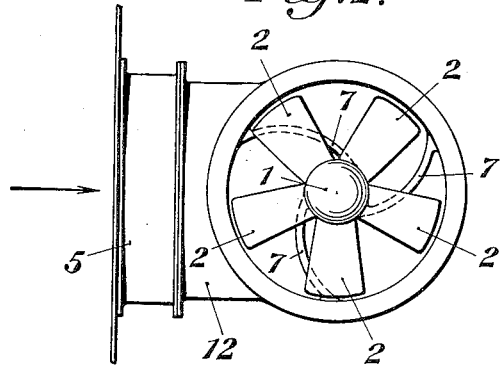
INVENTOR:
Alfred Buri
BY
Pennie, Davis, Marvin + Edmonds
ATTORNEY.

Patented July 17, 1934

1,966,787

UNITED STATES PATENT OFFICE 1,966,787

COOLING FAN FOR VEHICLES DRIVEN BY INTERNAL COMBUSTION ENGINES

Alfred Buri, Winterthur, Switzerland, assignor to the firm of Sulzer Frères Société Anonyme, Winterthur, Switzerland Application March 8, 1932, Serial No. 597,482
In Switzerland March 27, 1931

2 Claims. (Cl. 230—232)

This invention relates to cooling fans for vehicles driven by internal-combustion engines, such for example as Diesel locomotives, and of the kind comprising a bladed rotor or impeller rotatable within an air conduit upon a bearing having its axis substantially parallel to the longitudinal axis of the conduit and supported by members mounted on the inner surface of the conduit. The invention has for its object to provide an improved construction of such fan which when in operation on a moving vehicle will be less noisy than hitherto.

To this end according to the present invention the rotor blades and the supporting members for the rotor are so constructed or relatively arranged that, as viewed in the axial direction, the leading edge of each blade and each support always intersect at an angle.

Preferably each supporting member, as viewed in the direction of the axis of the rotor, is curved, for example spirally, and the number of rotor blades and the number of supporting members are so chosen that these numbers have no common factor so that the possibility of several blades simultaneously lying in the same position relatively to supporting members and thereby tending to render the fan noisy in operation is prevented.

One construction of cooling fan in accordance with the present invention is illustrated somewhat diagrammatically and by way of example in the accompanying drawing, in which Figure 1 is a sectional side elevation, and

Figure 2 is a plan.

In the construction illustrated, the fan comprises a rotor or impeller 1 having blades 2 and driven through a shaft 3 by a motor 4. The impeller 1 is arranged within an air conduit 12 so as to draw air through a cooler 5 in which the cooling water of the internal-combustion engine (not shown) is cooled. The impeller 1 rotates in a bearing 6 carried by three supporting members 7 mounted on the inner surface of the conduit 12 which is bent, as shown, at that end adjacent to the cooler 5.

As will be seen from Figure 2, each of the supporting members 7, as viewed in the direction of the axis of rotation of the impeller 1, is curved so that as the impeller rotates the leading edge of each blade 2 is at an angle to each support 7. In this way the leading edge of each blade passes over the members 7 relatively gradually, and noises due to interruption of wind pressure on the outlet of the fan which otherwise occur if the leading edges of the blades suddenly passed over the whole length of each of the supporting members are reduced.

Each of the supporting members 7 has a cross-section as indicated at 10 in Figure 1 so that the air flows in a direction substantially parallel to the axis of rotation of the impeller. The supports 7 may, however, if desired be made of streamline cross-section or may be arranged each at an angle to the axis of rotation of the impeller so that the supports will impart a rotary movement to the air current before it passes through the impeller.

The number of impeller blades and the number of supporting members are so chosen that these numbers have no common factor, whereby the passage of several blades simultaneously over supporting members in the same relative position thereto and thus causing the slight shocks imparted to the air current by the individual blades to take place simultaneously, is prevented. Thus, in the construction illustrated the impeller 1 is furnished with five blades 2 whilst the bearing 6 is supported by three supporting members 7. The air conduit 12 is provided with a guide wall 13 extending in the longitudinal direction of the conduit for the purpose of reducing to a minimum eddying of the air adjacent to the impeller wheel. The guide wall 13 in conjunction with the curved supporting members 7 results in a steady air flow and reduces to a minimum noises which would otherwise result due to the reversal of the direction of travel of the vehicle upon which it is mounted or the direction of the wind.

It will be understood that the construction above described is given by way of example only and that details may be modified without departing from the invention. Thus, for example, the guide wall 13 may if desired be connected to the supporting members 7 or these members may be so constructed as to constitute guide walls extending in the longitudinal direction towards the bend in the conduit 12. Further, additional supporting members or guide surfaces may be arranged between the supporting members and the impeller, these supporting members or guide surfaces being constructed in accordance with the invention so that the leading edges of the impeller do not suddenly pass over them.

I claim:

1. In a cooling fan the combination with an air conduit of a bladed impeller rotatable within the air conduit, of a bearing adapted to support the bladed impeller and its driving gear and of a number of supporting members mounted on the inner surface of the conduit and holding the bearing, the rotor blades and the supporting members being so arranged that the leading edge of each blade and each supporting member always intersect at an angle, the number of rotor blades and the number of supporting members being so chosen that these numbers have no whole integer as a common factor other than unity, each supporting member, in the radial direction being curved.

2. In a cooling fan the combination with an air conduit of a bladed impeller rotatable within the air conduit, of a bearing adapted to support the bladed impeller and its driving gear and of a number of supporting members mounted on the inner surface of the conduit and holding the bearing, the rotor blades and the supporting members being so arranged that, the leading edge of each blade and each supporting member always intersect at an angle, the number of rotor blades and the number of supporting members being so chosen that these numbers have no whole integer as a common factor other than unity, each supporting member, in the radial direction being spirally curved.

ALFRED BURI.